United States Patent
Schneider et al.

[11] Patent Number: 5,180,146
[45] Date of Patent: Jan. 19, 1993

[54] ROLLING PISTON FOR A ROLL BELLOWS OF A ROLL BELLOWS-TYPE PNEUMATIC SHOCK ABSORBER

[75] Inventors: Eckhard Schneider; Hubertus Gawinski, both of Lehrte, Fed. Rep. of Germany

[73] Assignee: Continental Aktiengesellschaft, Hanover, Fed. Rep. of Germany

[21] Appl. No.: 670,307

[22] Filed: Mar. 15, 1991

[30] Foreign Application Priority Data

Mar. 15, 1990 [DE] Fed. Rep. of Germany ....... 4008187

[51] Int. Cl.⁵ .............................................. F16F 9/04
[52] U.S. Cl. ................................ 267/64.27; 267/122
[58] Field of Search ............... 267/64.27, 64.23, 122, 267/124, 64.19, 64.21, 64.11, 64.24, 123; 92/98 D, 90, 99, 255

[56] References Cited

U.S. PATENT DOCUMENTS

| | | | |
|---|---|---|---|
| 4,506,910 | 3/1985 | Bierens | 267/64.21 X |
| 4,890,823 | 1/1990 | Koschinat et al. | 267/64.27 |
| 5,060,916 | 10/1991 | Koschinat et al. | 267/64.27 |

FOREIGN PATENT DOCUMENTS

| | | | |
|---|---|---|---|
| 0296445 | 12/1988 | European Pat. Off. | 267/64.27 |
| 1127729 | 4/1962 | Fed. Rep. of Germany | |
| 1285792 | 12/1968 | Fed. Rep. of Germany | |

*Primary Examiner*—Robert J. Oberleitner
*Assistant Examiner*—Peter M. Poon
*Attorney, Agent, or Firm*—Robert W. Becker & Associates

[57] ABSTRACT

During a shock absorbing movement a rolling crease of a roll bellows is supported at the outer mantle surface of a wall of a pot-shaped rolling piston in an arrangement for a roll bellows-type pneumatic shock absorber. In order to provide a rolling piston with a high stiffness and a low total weight the wall is provided with stiffening corrugations which are essentially extending in a longitudinal direction of the rolling piston. Due to the stiffening corrugations high loads exerted by the rolling crease and any maximum load peaks occurring during the dynamic operation of the pneumatic shock absorber may be securely received and compensated by the rolling piston.

6 Claims, 3 Drawing Sheets

ROLLING PISTON FOR A ROLL BELLOWS OF A ROLL BELLOWS-TYPE PNEUMATIC SHOCK ABSORBER

BACKGROUND OF THE INVENTION

The present invention relates to a pot-shaped rolling piston of a roll bellows-type pneumatic shock absorber whereby a rolling crease of the roll bellows is supported at an outer mantle surface of an annular wall of the rolling piston during a shock absorbing movement.

Rolling pistons are employed in roll bellows-type pneumatic shock absorbers. Roll bellows-type pneumatic shock absorbers are known in a variety of designs and have been successfully employed especially for shock absorbing functions for axles of trucks and buses. The roll bellows, with at least one end thereof, are fastened to the rolling piston whereby the rolling piston is usually made of metal or plastic materials. In an operating mode, the rolling piston is moved inside the roll bellows, so that the roll bellows is inverted and forms a rolling crease, which in return rolls on the outer mantle surface of the rolling piston.

The manufacture and mounting of the rolling piston requires a great technical expenditure. The rolling piston increases the total weight of the roll bellows-type pneumatic shock absorber. Endeavors to reduce the weight of the roll bellows-type pneumatic shock absorber resulted in the use of lighter materials for the rolling piston and also in different constructive designs.

During a shock absorbing movement the rolling crease exerts a great radial force onto the rolling piston, which when the walls are rather thin, may result in breakage of the rolling piston. Therefore, it has been suggested to provide the walls of the rolling piston with inner reinforcement ribs. The static and dynamic stiffness of the rolling piston then results from a combination of the wall thickness, the reinforcement ribs, and, in a few embodiments, a central supporting body.

Endeavors in the field are still directed towards the reduction of production costs of roll bellow-type pneumatic shock absorbers as well as reduction of the total weight due to selection of less expensive materials. It is also desired to improve the shock absorbing properties, especially by reducing the weight of the unsprung mass.

A rolling piston made from metal, rubber or plastic, is known from the German publication DE-AS 11 27 729 whereby the outer contours of the rolling piston widen in the direction of a bottom section in a continuous manner. The inside of the rolling piston is provided with horizontally arranged chambers that may be pressurized independent from one another. Due to the varying pressurization of the chambers the effective surface of the roll bellows-type pneumatic shock absorber may be adjusted to various operational requirements.

A cylindrical rolling piston is known from DE-AS 12 85 792 whereby the interior in the bottom section is sealed to the outside and is connected via an opening in the horizontal top section to the interior of the roll bellows in a pressure transmitting connection.

Experiments carried out in the past have shown, that the rolling piston, when made from lighter materials and/or provided with a reduced wall thickness, has a reduced stiffness of the walls and thus cannot withstand the maximum loads that occur during operation. The area of the rolling piston wall at which the rolling crease of the roll bellows during a shock absorbing movement is supported, experiences deformations and breakage.

It is known from DE-GM 89 03 264 to provide a rolling piston having a reduced weight and reduced material costs by decreasing the wall thickness of the rolling piston and compensating for the decreased thickness by generating pressure in the interior of the rolling piston.

It is therefore an object of the present invention to provide a light-weight rolling piston having a high stiffness.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
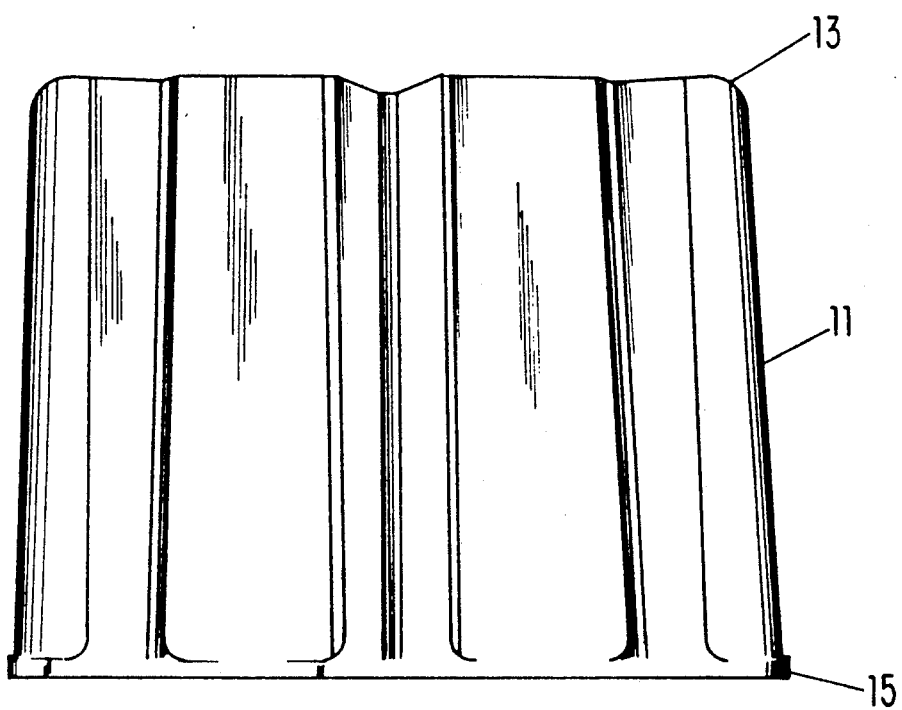
FIG. 1 is a side view of a rolling piston provided with stiffening corrugations.
Figure 2:
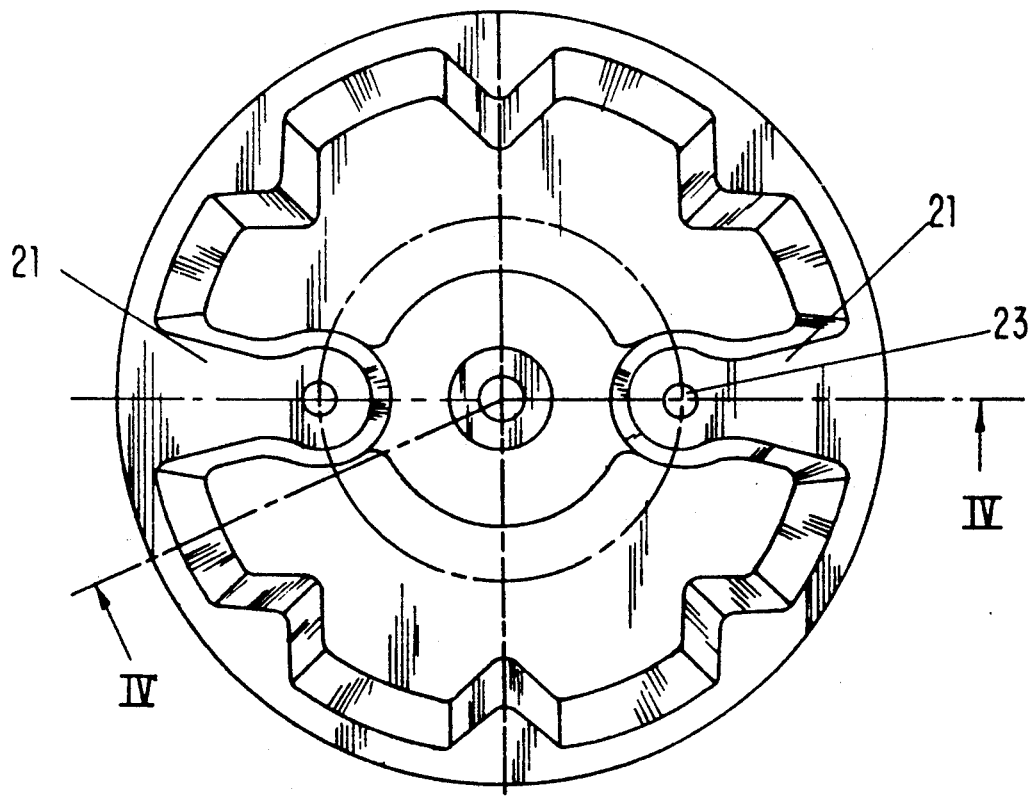
FIG. 2 is a plan view of the bottom section of the rolling piston according to FIG. 1.
Figure 3:
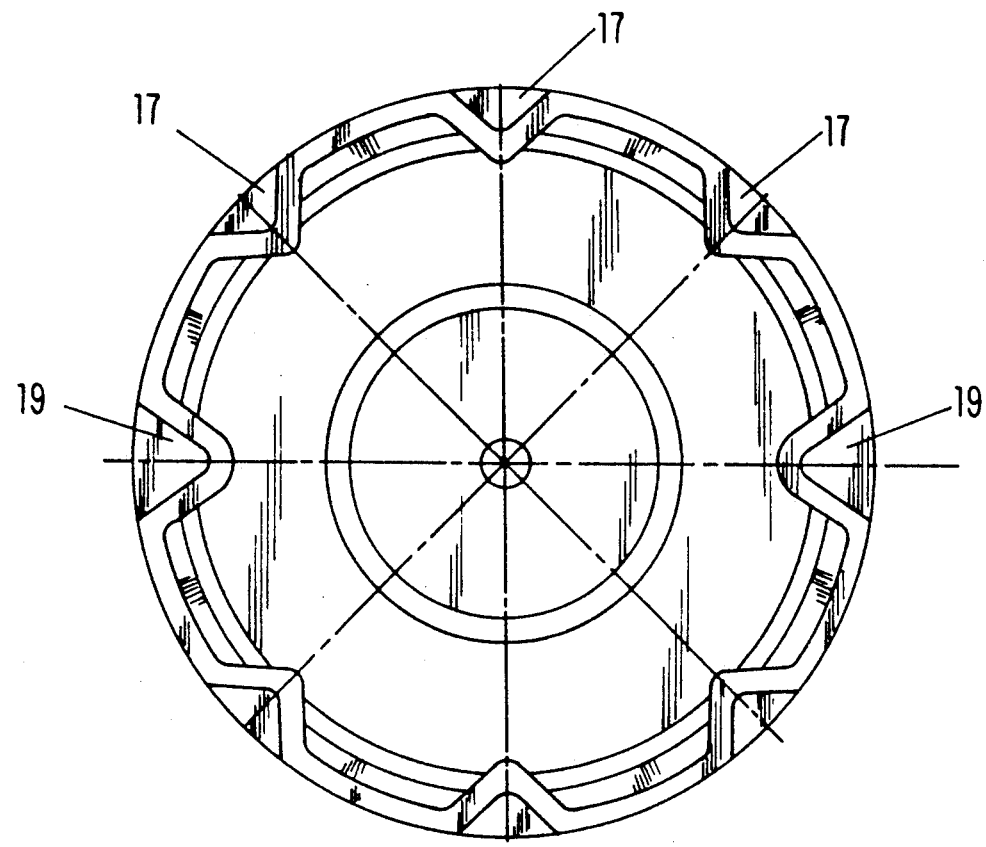
FIG. 3 is a top view of the rolling piston according to FIG. 1.

The rolling piston of the present invention is primarily characterized by stiffening grooves that are provided on the outer mantle surface of the wall in a longitudinal direction of the rolling piston During operation, the load radially exerted by the rolling crease onto the rolling piston periphery is safely and received and compensated due to the constructive design of the rolling piston wall. This is effected by the stiffening grooves which increase the bending resistance moment of the wall and at the sam time increase the buckling resistance of the rolling piston. It has been shown that a wall of a rolling piston that is provided with stiffening grooves exhibits a considerably increased stiffness when compared to conventional rolling pistons with a smooth outer surface wall, whereby a further advantage lies in the fact that the rolling piston may be embodied with thin walls and also as a single entity.

In an advantageous embodiment of the present invention the stiffening grooves are provided with closed end sections in the outer mantle surface of the wall. Thereby the circumferential stiffness at the bottom section is increased.

In a preferred embodiment the sections extend to a periphery of the rolling piston that corresponds to the maximum diameter of the rolling piston. Thus, dirt deposition is minimized and the manufacture of the rolling piston is facilitated.

In a further advantageous embodiment of the present invention an inner mantle surface of the wall is provided with reinforcement ribs whereby the depth of the stiffening grooves in the area of the reinforcement ribs is greater than a depth of the stiffening grooves in area without the reinforcement ribs. Due to the reinforcement ribs it is possible that the stiffening grooves in this respective area may be embodied with a greater depth, so that a further material reduction is possible.

In a preferred embodiment, fastening bores are provided in a bottom portion of the reinforcement ribs. Thus, the rolling piston may be fastened with its bottom section in a simple manner to a spring suspension of the respective vehicle.

In a further embodiment the rolling piston is made of a plastic material that is reinforced with fibers, whereby the fibers are arranged in an axial direction of the rolling piston. The tension and pressure loads at the bottom area of the stiffening grooves are thus received by the axially arranged fibers.

According to a further embodiment a bottom section of the rolling piston ma be sealed off by a bottom plate. With this embodiment the interior of the rolling piston may be used as an auxiliary air chamber of the roll bellows-type pneumatic shock absorber.

In a further embodiment the outer mantle surface widens in a direction of a bottom section of the rolling piston. Thus, during operation, the effective surface of the pneumatic shock absorber is adjustable to the shock absorbing movement. It is also possible to have varing outer contours in order to realize specific desired shock absorbing characteristics.

The stiffening grooves increases the stiffness of the rolling piston. Thereby, with a reduced wall thickness, high loads of the rolling crease and any load peaks that may occur during the dynamic operation may be received and compensated by the inventive rolling piston.

DESCRIPTION OF PREFERRED EMBODIMENTS

Figure 4:
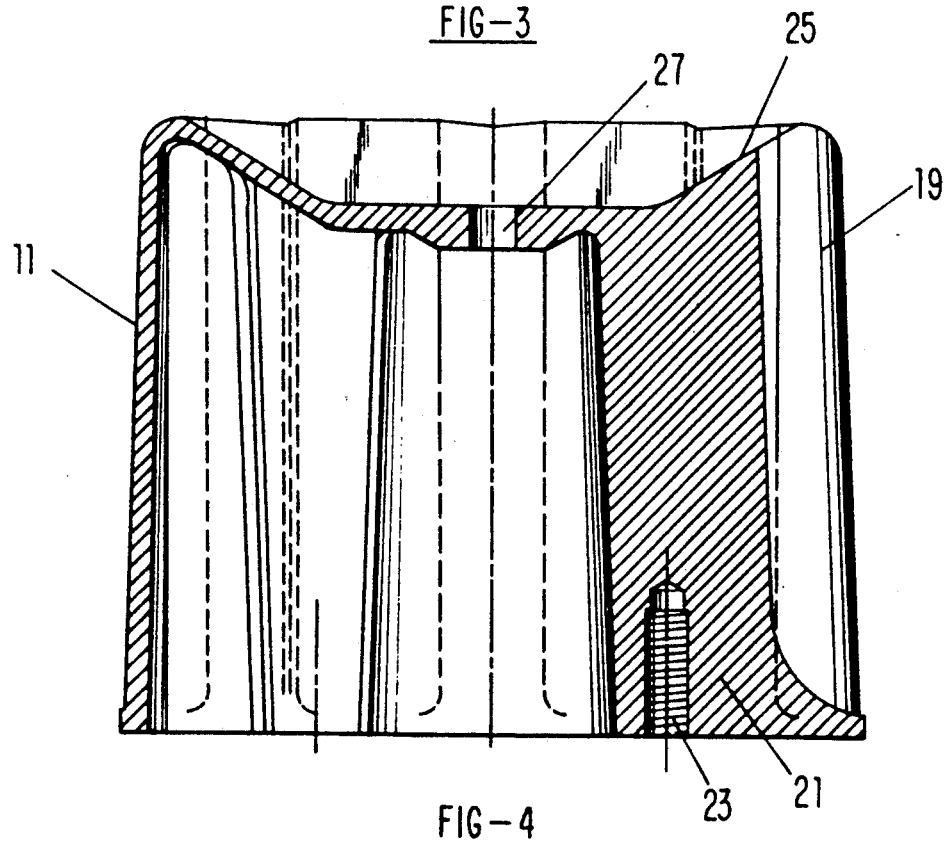
FIG. 4 and 4a shows an axial cross section of the rolling piston along the lines IV—IV in FIG. 2.
Figure 4A:
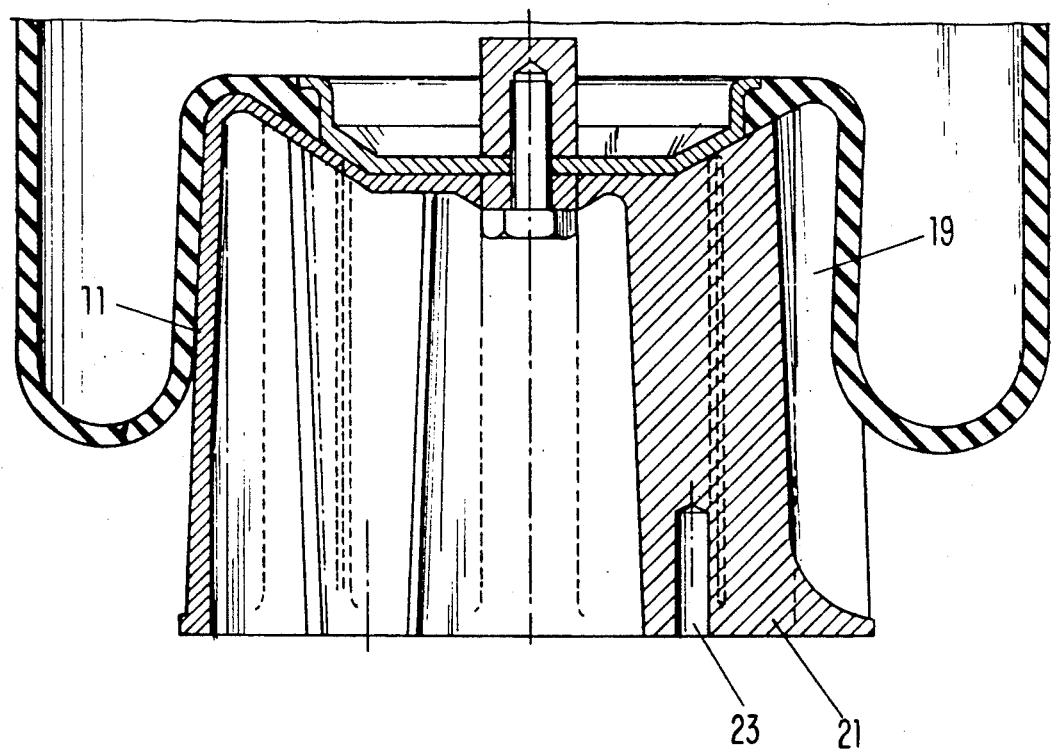

The outer contour or outer Mantle surface of the represented rolling piston corresponds to a truncated cone. The annular wall 11 of the rolling piston is provided with stiffening corrugations or grooves 17, 19 which extend from a top section 13 to a bottom section 15 in an axial direction. The stiffening corrugation or grooves 17, 19 are arranged about the periphery of the annular wall spaced at an angle of 45° to one another. Two diametrically opposed stiffening grooves 19 have a greater depth than the remaining stiffening grooves 17. In the area of the deeper stiffening grooves 19 two reinforcement ribs 21 extending radially inwardly are arranged at the inner mantle surface of the rolling piston (FIG. 1 and FIG. 4). They extend in an axial direction from the top section 13 to the bottom section 15. Fastening bores 23 are provided in a bottom portion of the reinforcement ribs 21 and the rolling piston may be fastened to a vehicle part, for example, the support for the pneumatic shock absorber, via those fastening bores 23.

In the bottom section 15, the stiffening grooves 17, 19 extend radially outwardly to a maximum diameter of the rolling piston.

At the top section 13 the pot-shaped rolling piston is provided with a radially inwardly extending recessed bottom part 25 which has a central bore 27 for receiving a fastening bolt, which is not represented in the drawings. The fastening bolt is vulcanized to the bottom of the roll bellows and is used to achieve a force locking connection of the roll bellows-type pneumatic shock absorber to the rolling piston.

When mounted, the rolling crease of the roll bellows moves along the outer mantle surface of the rolling piston. Despite the reduced wall thickness of the lightweight rolling piston there is no danger of breakage or buckling, since the stiffening grooves increase the bending resistance moment of the wall. The stiffening grooves also increase the buckle resistance of the rolling piston. The great shape stability and buckle resistance is achieved by the corrugated (grooved) open outer contour of the rolling piston.

The present invention is, of course, in no way restricted to the specific disclosure of the specification and drawings, but also encompasses any modifications within the scope of the appended claims.

What we claim is:

1. A pot-shaped rolling piston for a roll bellows-type pneumatic shock absorber, with a rolling crease of a roll bellows of said roll bellows-type pneumatic shock absorber being supported at an outer mantle surface of an annular wall of said rolling piston during a shock absorbing movement, comprising:

Stiffening grooves provided on said outer mantle surface in a longitudinal direction of said rolling piston wherein a first set of said stiffening grooves has a greater depth than a second set of said stiffening grooves and wherein, at a bottom section of said rolling piston, said stiffening grooves are provided with end sections in said outer mantle surface, with said end sections closing said stiffening grooves and extending to a periphery of said rolling piston corresponding to a maximum diameter thereof.

2. A pot-shaped rolling piston according to claim 1 further comprising reinforcement ribs provided at an inner mantle surface of said wall, said reinforcement ribs being arranged in an area of said stiffening grooves of greater depth.

3. A pot-shaped rolling piston according to claim 2, wherein fastening bores are provided in a bottom portion of said reinforcement ribs.

4. A pot-shaped rolling piston according to claim 1, wherein said rolling piston is made of a plastic material that is reinforced with fibers, with said fibers being arranged in an axial direction of said rolling piston.

5. A pot-shaped rolling piston according to claim 1, wherein said rolling piston, at a bottom section, is sealed off by a bottom plate.

6. A pot-shaped rolling piston according to claim 1, wherein said outer mantle surface widens in a direction of a bottom section of said rolling piston.

* * * * *